United States Patent [19]

McWhorter

[11] Patent Number: 4,467,756

[45] Date of Patent: Aug. 28, 1984

[54] PARTIALLY CONSTRAINED FIVE-BAR MECHANISM FOR RECIPROCATING PISTON ENGINES

[76] Inventor: Edward M. McWhorter, 6931 Greenbrook Cir., Citrus Heights, Calif. 95610

[21] Appl. No.: 262,038

[22] Filed: May 11, 1981

Related U.S. Application Data

[63] Continuation-in-part of Ser. No. 120,381, Feb. 11, 1980, abandoned.

[51] Int. Cl.³ .............................................. F02B 75/32
[52] U.S. Cl. ............................ 123/197 AC; 74/579 E; 74/595; 123/197 AB
[58] Field of Search .................... 74/579 E, 595, 602, 74/603, 604; 123/197 AB, 197 AC

[56] References Cited

U.S. PATENT DOCUMENTS

| 1,574,573 | 2/1926 | Hale ............................ 123/197 AC |
| 1,595,917 | 8/1926 | Owen ........................... 123/197 AC |
| 2,165,791 | 7/1939 | Farrell .......................... 123/197 AB |
| 2,287,472 | 6/1942 | Eby .................................. 74/602 X |
| 4,266,443 | 5/1981 | McWhorter ...................... 74/579 E |
| 4,301,695 | 11/1981 | Reiher ................................. 74/602 |
| 4,319,498 | 3/1982 | McWhorter ..................... 74/602 X |

FOREIGN PATENT DOCUMENTS 2414122  8/1979  France ........................ 123/197 AC

*Primary Examiner*—Leslie A. Braun
*Assistant Examiner*—Frank McKenzie

[57] ABSTRACT

The invention relates to new and useful improvements in the design of partially constrained five-bar mechanism for use in reciprocating piston engines and compressors. The design comprises a piston and connecting rod assembly which is driven by a crank having an intervening linkage which varies the effective crank radius. The advantages of the design are in the larger swept cylinder volume which increases the air consumption rate and in the increased mechanical advantage during the power stroke. The mechanism accelerates the piston during the terminal phase of the compression stroke which improves ignition and combustion at lean limit operating conditions.

11 Claims, 10 Drawing Figures

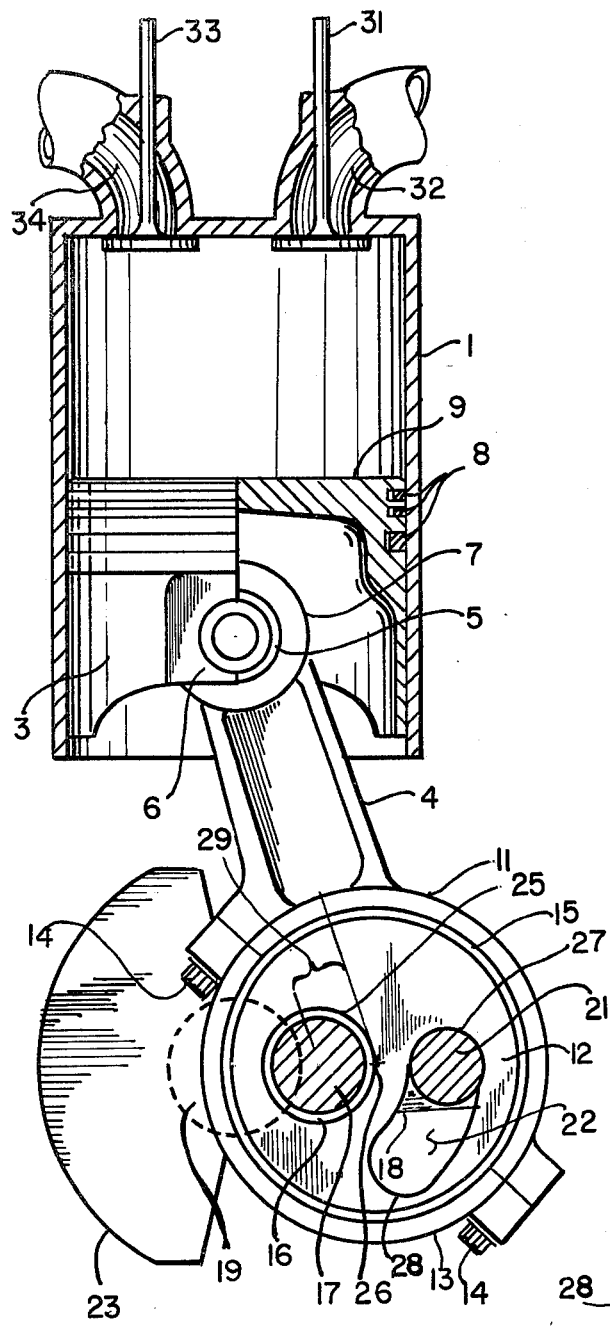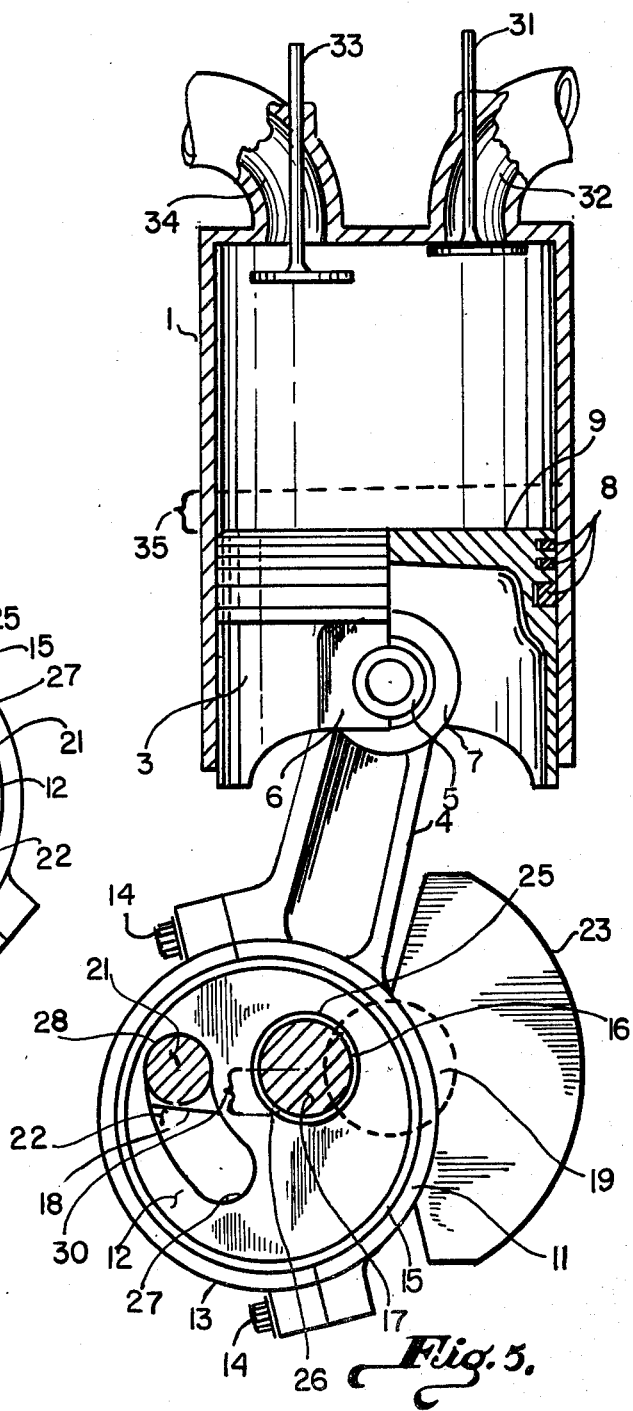
Fig. 3.
Fig. 5.

PARTIALLY CONSTRAINED FIVE-BAR MECHANISM FOR RECIPROCATING PISTON ENGINES

CROSS REFERENCES

The present invention is a continuation-in-part of my co-pending application Ser. No. 120,381, filed Feb. 11, 1980, now abandoned, and is of a generally similar character to that constituting the subject matter of my co-pending application Ser. No. 047,106 filed June 11, 1979, now U.S. Pat. No. 4,319,498.

BACKGROUND OF THE INVENTION

1. Field of the Invention

The invention is a reciprocating piston mechanism for use in heat engines or in crank driven compressors. The invention may also be classified as a variable stroke, variable crank throw, or free floating piston engine system.

2. Description of Prior Art

Almost all reciprocating systems used in heat engines and compressors today are of the type generally described as four-bar mechanism having a sliding piston member. Piston motion in the four-bar slider mechanism is most commonly estimated from its positional relationship within the engine cylinder relative to the top-dead-center position and is calculated as the sum of the chordal heights generated by the swing of the crankpin and pivotal movement of the connecting rod when measured along the axial center of the cylinder. Therefore, changes in piston velocity and acceleration can only be accomplished by changes in the chordal influencing functions. In the present invention this is accomplished by cyclical changes in the effective crank radius and connecting rod angle.

In engines of the general type to be described an additional link is placed between the crankpin and the main journal of the connecting rod thus creating a five-bar system. The added link is a disc, hereinafter termed the "transfer disc", which is constrained to a pivotal motion thus creating a partially constrained five-bar linkage. I have discovered that the constraining boundaries of these types of systems can be used to vary the crank radius and connecting rod angle, as previously stated, in a manner which is most conducive to the efficient operation of such equipment. With this type of system the effective crank radius can be increased on the downstroke thus improving the mechanical advantage during the power stroke. In a similar manner the effective crank radius is decreased on the upstroke thus decreasing the pumping work during the compression. In this instance the free-floating piston action, which occurs as a result of the pivotal action of the transfer disc, is used to accelerate the final compression which facilitates ignition and propagation of combustion when the engine is operated at lean fuel limit.

The present invention, though similar to the referenced application represents an alternative method of applying constraint to the fifth bar, which in this instance is the transfer disc. In the present invention the constraining mechanism, which is a second crankpin termed "the secondary crankpin", is fixedly attached to the crank arm and therefore is easily balanced by the design proportions of the crank counterbalance. In the referenced application the constraining pin is subject to radial accelerations which can result in the amplification of primary vibration and to increased bending moments and torsional stresses on the crank.

The construction of crank of the present invention is simplified over that of the referenced application by mounting the secondary crankpin on the crank arm adjacent to the primary crankpin and therefore the cost to manufacture this system is less.

In the present invention each throw of the crankshaft contains two crankpins, a primary crankpin and the aforementioned secondary crankpin. The transfer disc is rotatively mounted on the primary crankpin but its motion relative to that of the crankshaft is pivotally controlled within specified limits by the secondary crankpin which works in a slot machined in the transfer disc. The length of the slot in the transfer disc determines the range or boundary for five-bar operation which is the period during which the secondary crankpin is not in contact with either end of the slot and the piston is moving freely under its own momentum. Because the engine depends heavily on inertial loads applied on the reciprocating components for proper operation, it functions most reliably when operated at a constant speed for powering electrical generators and pumping equipment.

The most novel feature of the design is the crankshaft which employs two crankpins. This feature operating in conjunction with the aforementioned transfer disc, allows the piston to accelerate during the terminal period of the compression stroke. The accelerated compression stroke increases the molecular collision rate of the fuel and oxygen particles inducted above the piston thus facilitating ignition and combustion at lean limit conditions which decreases the fuel consumption rate of this type of engine.

SUMMARY OF THE INVENTION

In engines of the aforementioned character, it is the primary object to provide, in a manner herinafter set forth, a more efficient means of applying partial constraint of five-bar reciprocating mechanism which will decrease the primary mode of vibration in these types of engines and will also reduce bending and torsional stresses on the crank.

Another object of the invention is to provide a simpler method of construction of engines of this type such that their cost of manufacture is substantially reduced.

It is yet another object of the invention to provide a means of accelerating piston motion during the terminal period of the compression stroke in order to facilitate ignition and combustion at fuel lean limit conditions.

It is still another object of the invention to increase the air consumption rate of such engines by increasing the stroke of the piston.

And yet it is another object of the invention to improve the mechanical advantage of the mechanism by increasing the length of the crankarm on the power stroke and decreasing its length on the upstroke during the exhaust and compression strokes.

All of the foregoing and still further objects and advantages of the invention will become apparent from the study of the drawings and detailed description which follows.

BRIEF DESCRIPTION OF THE DRAWINGS

There are presented as part of the specification drawings showing the various features of the reciprocating mechanism.

FIG. 3 is a front view of the reciprocating mechanism at a position of 90° crank rotation during the power stroke.

FIG. 5 is a front view of the reciprocating mechanism shown at a 270° crank rotation during the piston upstroke during the exhaust upstroke.

DESCRIPTION OF THE PREFERRED EMBODIMENT

Figure 1:
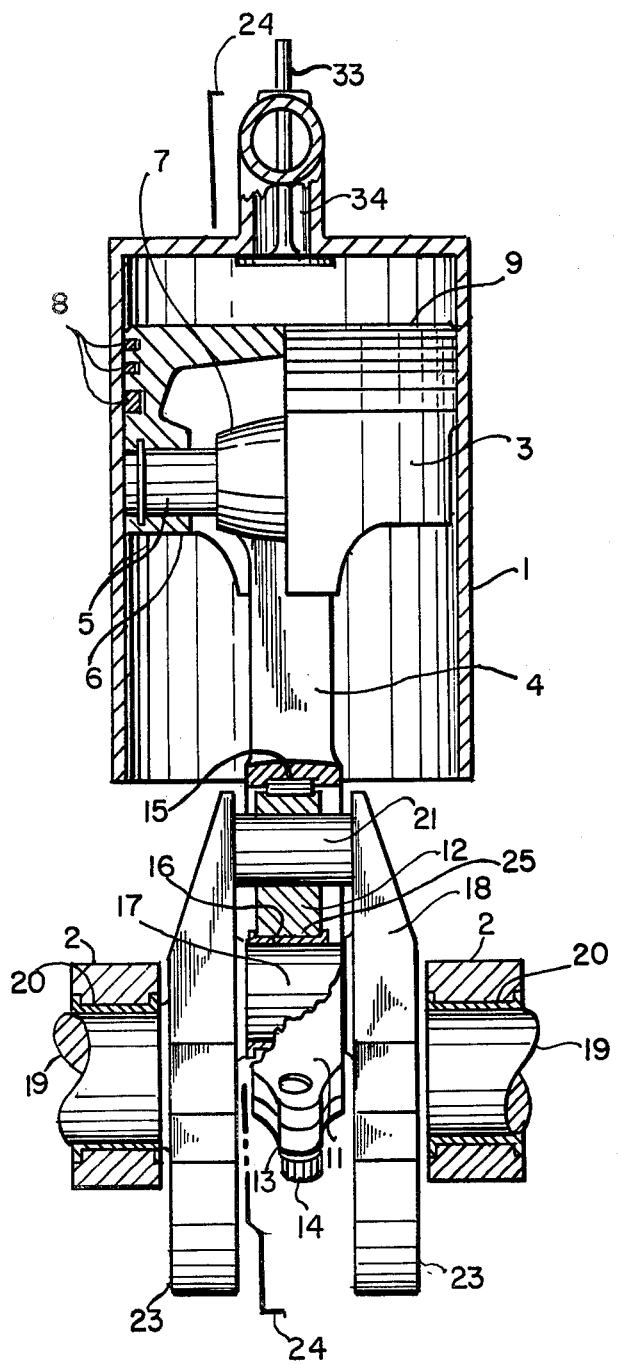
FIG. 1 is a side view of the reciprocating mechanism whith the engine cylinder and block shown principally in cross-section for clarity.

Turning now to the drawings and to FIG. 1 thereof in particular, which is a side view of the reciprocating components shown with the engine cylinder 1 and block 2 cut away for clarity. Piston 3 is slidably mounted in cylinder 1 and pivotally attached to connecting rod 4 by pin 5 which runs transversely through piston bosses 6 and connecting rod small journal housing 7. Other features comprising piston 3, which are common to most pistons, are rings 8 for sealing pressure above the piston crown 9 and cylinder 2 and slip rings 10 for holding pin 5 within piston bosses 6. The connecting rod 4, major journal housing 11 is rotatively mounted on transfer disc 12 by bearing cap 13 which is held in place by bolts 14. Bearing 15 is placed between major journal housing 11 and transfer disc 12 to facilitate the rotation. Transfer disc 12 journal housing 25 which holds bearing 16, is rotatively mounted with bearing 16 on primary crankpin 17. Crankpin 17 is fixedly attached to crank arms 18 which are in turn fixedly attached to main shafts 19. Mainshafts 19 are rotatively journaled in bearings 20 which are held in block 2. A second crankpin, hereinafter termed "secondary crankpin 21" having an axial center which is parallel to that of the primary crankpin 17 but not necessarily aligned on the centerline extending along the crank radius of crank arms 18, between the centers of primary crankpin 17 and mainshafts 19. That is to say, secondary crankpin 21 may be aligned with, or on either side of the crankarm centerline comprising the crank radius. The actual placement of the secondary crankpin 21 is determined by the engine operating design requirements which consider the cyclic pressure changes in cylinder 1 above piston crown 9 relative to those below piston crown 9, engine speed, and the inertial loads on crank rotational and reciprocating connecting rod and piston translating components. In order to facilitate the manufacture of the crankshaft the secondary crankpin 21 may be manufactured as a separate component and fixedly attached to crank arms 18 after the final machining of primary crankpin 17. The means of attachment of secondary crankpin 21 to crank arms 18, which can be accomplished by welding, press-fit through holes drilled in crank arms 18, or by screw threads, is a matter of manufacturing preference.

Figure 2:
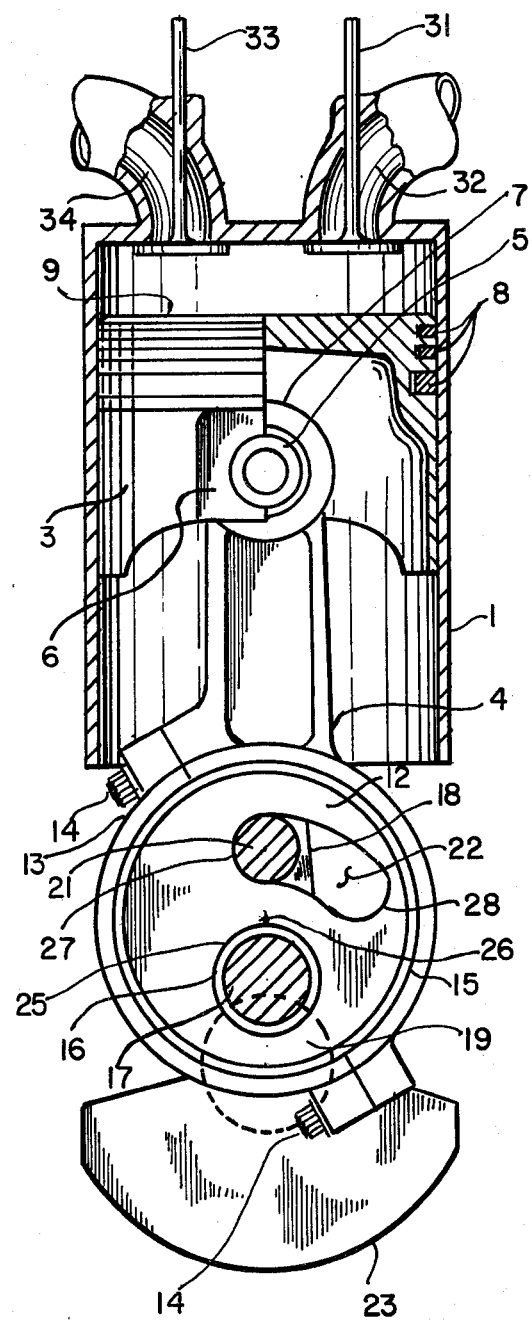
FIG. 2 is a front view of the reciprocating mechanism shown at the top-dead-center position of crank rotation and represents the engine section at the cutting plane noted in FIG. 1.

Secondary crankpin 21 passes transversly through slot 22 of transfer disc 12, shown in greater detail in FIG. 2, thus restricting the motion of transfer disc 12 to a pivotal or rocking motion on primary crankpin 17 when viewed relative to a given stationary crank position. The additional weight of secondary crankpin 21 is counterbalanced across the rotational axis of main shafts 19 by counter weights 23 in the conventional manner common to most crankshafts.

Turning now to FIG. 2 which is a frontal section view of FIG. 1 cut at point 24. In this view the predominant features of transfer disc 12 are seen to comprise a journal housing 25 which holds bearing 16 for pivotal mounting on primary crankpin 17 which is shown as a cross-hatch section. Directly above journal housing 25 is the geometric center 26 of transfer disc 12. It is necessary to designate the geometric center of transfer disc 12 as a salient feature of the design since pressure forces generated on piston crown 9 are transmitted through connecting rod 4 and thus pass through the geometric center 26 of transfer disc 12 producing a rotational moment about the pivotal axis of primary crankpin 17. The line of action of the pressure forces extending above or below the geometric center 26 and crossing perpendicularly a line extending from the center of the primary crankpin 17 define the moment of rotation 29 shown in FIG. 3, which is an additive component to the rotative effort generated by the crank radius extending between the centers of primary crankpin 17 and mainshafts 19. In this fashion the effective crank radius is varied in a manner which is conducive to increased mechanical advantage in the overall cyclic conversion process. The additive component of crank radius during the power stroke is designated by the bracket presented as element 29 shown in FIG. 3. With the transfer disc in the position as shown in FIG. 2 the additive component of crank radius is zero since the axial centers of main shafts 19 secondary crankpin 21, geometric center 26 and pin 5 are all aligned.

In FIG. 2, it can be seen that slot 22, holding secondary crankpin 21, is positioned above and to one side of journal housing 25. The selected location of slot 22 on transfer disc 12, relative to journal housing 25, will vary with the engine design and the positioning of the secondary crankpin 21 on crank arms 18, as previously stated. Slot 22 has a top end 27 and a bottom end 28 which alternately contact the secondary crankpin 21 and thereby restrict the pivotal movement of transfer disc 12 on primary crankpin 17 relative to a given stationary crank position.

Figure 4:
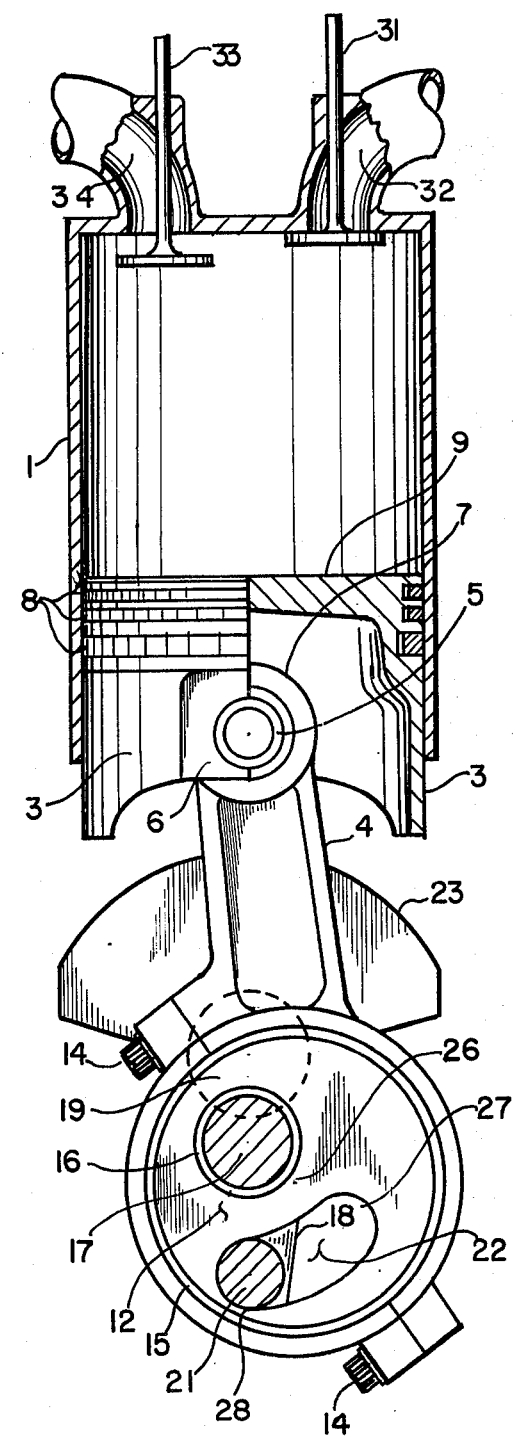
FIG. 4 is a front view of the reciprocating mechanism shown at the bottom-dead-center position of crank rotation.

Looking now at the manner in which the reciprocating mechanism functions your attention is again invited to FIG. 2. During normal operation the top end 27 of slot 22 is in contact with secondary crankpin 21 which is the normal rotational position of transfer disc 12 during the start of the power stroke at the top-dead-center of crankshaft rotation. Intake valve 31 operating in intake port 32 and exhaust valve 33 operating in exhaust port 34 are both closed. At 90° crank rotation, as shown in FIG. 3, the top end 27 of slot 22 is still in contact with the secondary crankpin 21. This is because the line of action of pressure forces acting along connecting rod 4 between the centers of small journal housing 4 and main journal housing 11 produce a moment of rotation on disc 12 thus maintaining this position. The top end 27 of slot 22 remains in contact with secondary crankpin 21 until crank rotation approaches the bottom-dead-center position at which time exhaust valve 33 opens and the exhaust blowdown commences with exhaust gases exiting cylinder 1 through exhaust port 34. Because of the small bore to stroke ratio of this type of engine, and because of the sequenced exhaust valve 33 opening allowing the inertia of high velocity exhaust gas flowing through exhaust port 34 to persist to a point where the cylinder pressure above piston crown 9 will momentarily drop below the ambient operating pressure below piston crown 9. This momentary change in pressure coupled with the rotative inertial loads on the reciprocating components will cause the secondary crankpin 21 to reseat itself at the bottom end 28 of slot 22 as shown in FIG. 4. The transition of secondary crankpin 21 from the top end 27 of slot 22 to the bottom end 28, may occur at crank rotational positions of approximately twenty degrees before or after the bottom-dead-center position is reached. The actual position at which the transition occurs depends on engine speed, exhaust valve timing, intake valve timing, length of piston 3 stroke and the relative weight and placement of the reciprocating components.

The pivotal rotation of transfer disc 12 upon the primary crankpin 17 is brought about by a number of factors. These factors are of two general types, pressure forces acting on the reciprocating masses. The latter inertial forces, acting at the small journal housing 7 of connecting rod 4, are of a purely translational nature and may be directly combined with the pressure forces acting on the piston. Inertial forces acting at the center of journal housing 25 of transfer disc 12 are purely rotational comprising radial and tangential components. However, forces acting on reciprocating masses located between small journal housing 7 and journal housing 25 are a combination of translation and rotational component forces. The dynamic forces act at the moment of inertia of the reciprocating masses while the piston 3 pressure forces are transmitted toward, and act on the geometric center of transfer disc 12. It is the magnitude of the resultant vector force of inertial and pressure forces which determines the pivotal position of transfer disc 12 on primary crankpin 17.

Turning now to FIG. 5, which shows the crankshaft at a clockwise rotational position of 270° during the exhaust stroke. Exhaust valve 33 is open and piston 3 is on the upward stroke pushing exhaust gases out through exhaust port 34. The secondary crankpin 21 is still in contact with the bottom end 28 of slot 22. The additive component of crank radius, element 29, is considerably smaller than noted in FIG. 3. The smaller element 29 decreases the effective crank radius thus reducing the amount of pumping work required during the exhaust stroke. It will be noted that the geometric center 26 of transfer disc 12 is lower than the center of primary crankpin 17, shown as bracketed element 30, which decreases the height of piston 3 in cylinder 1, as compared with that shown in FIG. 3, by the amount designated by the bracketed element 35.

At the crankshaft rotational point where the included angle between the crank arm 18 and connecting rod 4 is 90 degrees the piston attains its maximum upward acceleration. Past this point the vertical component of crank rotation, as plotted in rectangular coordinate form, begins to decrease appreciably. Inertial forces acting on the piston and associated reciprocating components cause the piston to continue at high velocity thus rotating the transfer disc 12 on primary crankpin 17 and thus the mechanism again assumes the pivotal position at top-dead-center as shown in FIG. 2 and secondary crankpin 21 is again contacting the top end 27 of slot 22. This position completes the exhaust stroke.

The contact of secondary crankpin 21 with the top end 27 of slot 22 is only momentary and occurs within a crank rotational range of about thirty degrees before top-dead-center to about twenty degrees after top-dead-center. Again, the actual position depends on engine design and operating conditions as previously noted. An approximate position is shown in FIG. 6 for the beginning of the intake stroke.

Figure 6:
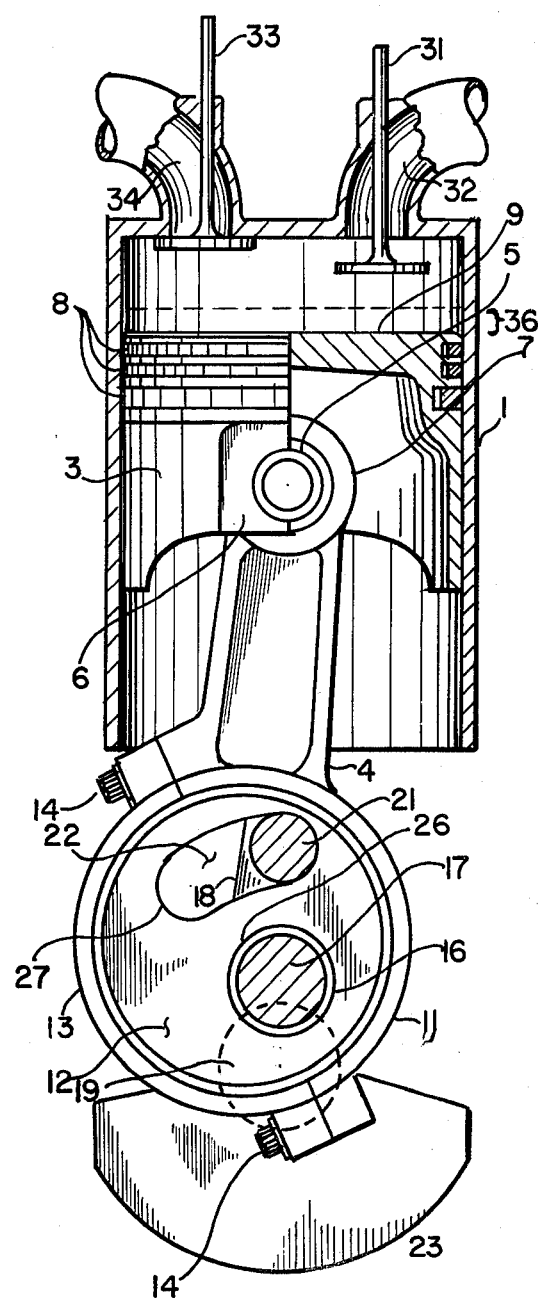
FIG. 6 is a front view of the reciprocating mechanism shown at the top-dead-center position of crank rotation at the beginning of the induction stroke.

At the end of the exhaust stroke the exhaust valve 33 closes exhaust port 34 and the intake valve 31 opens to allow the air-fuel charge from intake port 32 to enter cylinder 1 above piston crown 9 during the intake stroke as shown in FIG. 6. Because of volumetric flow impedance through intake port 32, the pressure within the cylinder 1 is lower above piston crown 9 than the ambient pressure below piston crown 9. This condition produces an upward pulling motion of primary crankpin 17 and secondary crankpin 21 against the bottom end 28 of slot 22 for the entire intake stroke.

It should be noted that when secondary crankpin 21 contacts the bottom end 28 of slot 22 at the top-dead-center position as shown in FIG. 6 the piston 3 sits at a lower position in cylinder 1 than when the secondary crankpin 21 is contacting top end of slot 22 as shown in FIG. 2. The relative difference in piston 3 positions is shown in FIG. 6 as bracketed element 36. This condition demonstrates the variable clearance capability of the invention.

At the end of the intake stroke the intake valve 31 closes intake port 32 and the subsequent compression stroke begins.

On the upstroke of piston 3 in cylinder 1 during the compression stroke the pivotal position of transfer disc 12 is as shown in FIGS. 4 and 5. However in this instance both intake valve 31 and exhaust valve 33 are closed. As the crankshaft continues to rotate in a clockwise direction the piston once again attains its maximum upward acceleration at the point of 90 degree intersection of the crank arm and connecting rod as previously shown during the exhaust stroke. Because the pressure in cylinder 1 is still relatively low as a result of the decreased height of piston 3 in cylinder 1 shown as bracketed element 35 in FIG. 5, piston 3 again floats upward at near maximum speed as the vertical component of primary crankpin 17 motion, as plotted on the rectangular coordinate grid system begins to decrease. The terminal phase of the compression is therefore completed by the inertial forces of the accelerating piston 3 and associated reciprocating components. These forces must be sufficiently larger than the opposing pressure forces above the piston crown 9 in order to complete the transition. Therefore, piston diameter is limited to a given compression ratio relative to the inertial energy available in the free floating piston system at the termination of the compression stroke. From a practical standpoint, the ratio of the cylinder bore to the piston stroke of these types of engine are always less than unity, commonly referred to as under square systems.

When the compression stroke is complete the transfer disc 12 and crankshaft are once again in the top-dead-center position as shown in FIG. 2. However, unlike the exhaust stroke previously described the secondary crankpin 21 remains in contact with top end 27 of slot 22 because of a slight offset of the transfer disc 12 geometric center 26 which causes the mechanism to function as a toggle. Combustion pressures above piston crown 9 maintain the toggled condition throughout the power stroke previously described.

Engines of the character described, because of their dependence on dynamic forces for their satisfactory operation, are best designed as constant speed systems in which the load range is compensated for by corresponding controlled variations in the ratio of air to fuel mixture. These engines are ideally suited for powering electrical generating or pumping systems since the purchase incentive for this type of equipment is more apt to be influenced by operational cost rather than the time dependent peformance factors governing other types of engine design. The present invention was initially designed for use as a hybrid-engine in electrically propelled vehicles where the lean-limit capability is most cost effective.

Figure 7:
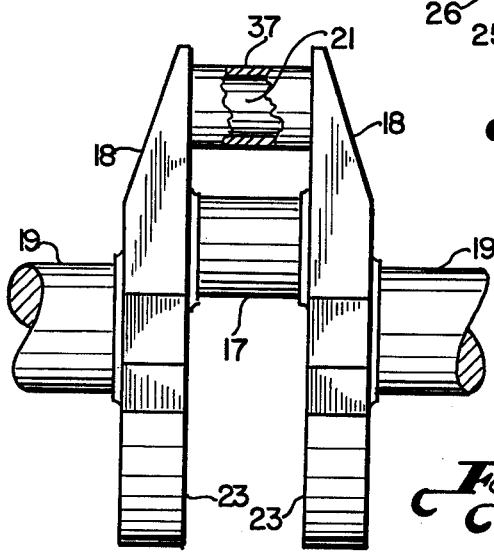
FIG. 7 is a side view of the crankshaft showing a preferred method of impact damping.

The metal to metal contact of the secondary crankpin 21 with the top end 27 and bottom end 28 of slot 22 produces a slight clicking noise. Therefore, a resilient material is placed between the contacting surfaces which significantly decreases the noise level. This is accomplished by placing a tubular sheath 37 of resilient material over the secondary crankpin 21 as shown in FIG. 7. Another method of accomplishing the reduction of the noise of the impact is by embedding resilient material impactors 38 at both the top end 27 and the bottom end 28 of slot 22 as shown in FIG. 8.

Figure 10:
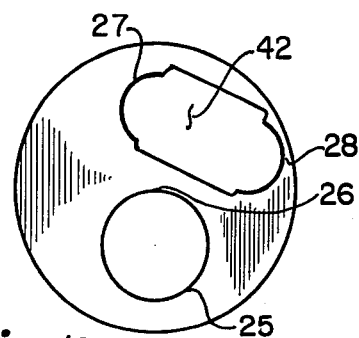
FIG. 10 is a front view of the transfer disc showing an alternate manner of shaping the slot.

On larger engines, where the alternating contact of the secondary crankpin 21 at each end of slot 22, as shown in FIGS. 1 through 6, may introduce excessive loads on the material of construction of transfer disc 12 and secondary crankpin 21, the impact may be softened by hydraulic damping techniques. This is achieved by designing the resilient impactors 38 of FIG. 8 as flexible circular sections, shown in FIG. 10 as impactors 39, which impede the flow of lubricating oil which is flowing under pressure in channels 40 drilled or cast in transfer disc 12. The lower ends 41 of impactors 39 are fixedly attached by embedding them in transfer disc 12 while the upper ends are free to flex. Oil flowing from channels 40, surges between the flexible portion of impactor 39 and the ends, top end 27 and bottom end 28, of slot 22 lifting the flexible portion of impactors 39. When the secondary crankpin 21 contacts the impactor 39 the intervening oil is squished out thus lowering the force of the impact and bringing the flexible section of impactor 39 once again in contact with the ends of slot 22.

This type of hydraulic damping is preferable to using hydraulic or pneumatic dashpot piston actions which require longer actuating movement and tend to overheat.

Figure 9:
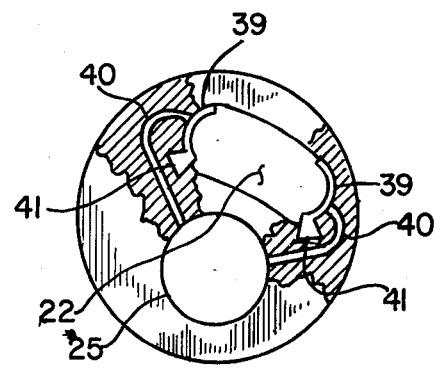
FIG. 9 is a front view of the transfer disc showing the preferred method of impact hydraulic damping.
Figure 8:
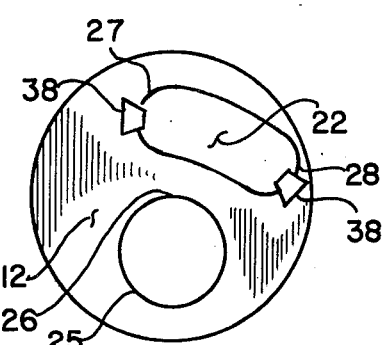
FIG. 8 is a front view of the transfer disc showing an alternate method of impact damping.

It will be apparent to those skilled in the art, that the crankshaft shown in FIG. 7 may be used with transfer disc 12 shown in FIGS. 1 through 6 or with the transfer discs shown in FIGS. 8 and 9 without effecting the operation as described.

The slot 22 of transfer disc 12, previously described and indicated in FIGS. 1 through 8, has been depicted as a circular segment or arc with its radius at the center of primary crankpin 17. This is not to be construed as a limiting factor since slot 22 may be depicted as a straight section 42 milled in transfer disc 12 as shown in FIG. 9.

What is claimed is:

1. A reciprocating piston mechanism comprising a cylinder, a piston reciprocally mounted in said cylinder, a connecting rod comprising a small journal and a major journal, said small journal pivotally mounted in said piston said major journal being rotatively mounted on a transfer disc, said transfer disc comprising a journal housing, a slot positioned to one side of said journal housing, said slot having a top end and a bottom end, a crankshaft comprising crankarms, a primary crankpin fixedly attached to said crankarms, a secondary crankpin having its axial center parallel to that of the said primary crankpin and being also fixedly attached to said crankarms, mainshafts fixedly attached to said crank arms and rotatevely mounted in a block, said journal housing of said transfer disc being rotatively mounted on the said primary crankpin of said crankshaft, the said slot of said transfer disc slidably holding the said secondary crankpin such that the said secondary crankpin contacts the said top end of said slot during the power stroke of said piston and alternately contacts the said bottom end of said slot during the intake, compression and exhaust stroke of said piston.

2. The mechanism of claim 1 in which the said second any crankpin is sheathed in a tubular resilient material.

3. The mechanism of claim 2 in which resilient impactors are fixedly attached at each end of the said slot.

4. The mechanism of claim 2 in which flexible impactors are mounted in each end of said slot, said disc having oil channels, said flexible impactors partially impeding the flow in said oil channels.

5. The mechanism of claim 1 in which resilient impactors are fixedly attached at each end of the said slot.

6. The mechanism of claim 1 in which flexible impactors are mounted in each end of said slot, said disc having oil channels, said flexible impactors partially impeding the flow in said oil channels.

7. The reciprocating mechanism of claim 1 in which a tubular sheath of resilient material is placed over the surface of said secondary crankpin to reduce the noise of contact between the said secondary crankpin and the said top end and said bottom end of said slot of said transfer disc.

8. The reciprocating mechanism of claim 1 in which impactors constructed of a resilient material are embedded at the said top end and said bottom end of said slot of said transfer disc in order to decrease the noise level during the alternating contact of said secondary crankpin with each said end of said slot.

9. The reciprocating mechanism of claim 1 in which a tubular sheath of resilient material is placed over the said secondary crankpin of said crankshaft and impactors of a resilient material are imbedded at the said top end and said bottom end of said slot in said transfer disc.

10. The reciprocating mechanism of claim 1 in which flexible impactors are mounted at the said top and said bottom ends of said slot of said transfer disc, said transfer disc having oil channels, said flexible impactors partially impeding the flow of oil in said channels when said flexible impactors are in contact with the said secondary crankpin of said crankshaft.

11. The reciprocating mechanism of claim 1 in which the said cylinder, said piston, said transfer disc and said crankshaft comprise a single reciprocating assembly of an engine comprising a plurality of such assemblies.

* * * * *